(12) United States Patent
Mogi

(10) Patent No.: US 6,719,096 B2
(45) Date of Patent: Apr. 13, 2004

(54) BREATHER DEVICE FOR POWER TRAIN OF ELECTRIC VEHICLE

(75) Inventor: Seiichi Mogi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 51 days.

(21) Appl. No.: 10/216,192

(22) Filed: Aug. 12, 2002

(65) Prior Publication Data

US 2003/0098204 A1 May 29, 2003

(30) Foreign Application Priority Data

Nov. 27, 2001 (JP) ........................................ 2001-361583

(51) Int. Cl.⁷ .............................................. F01M 08/11
(52) U.S. Cl. ........................ 184/6.23; 74/606 R; 310/89
(58) Field of Search .......................... 74/606 R, 606 A, 74/607; 184/6.12, 6.23, 11.1; 310/89, 75 R

(56) References Cited

U.S. PATENT DOCUMENTS

| | | | | |
|---|---|---|---|---|
| 4,000,664 A | * | 1/1977 | Christensen | 74/89.44 |
| 4,893,039 A | * | 1/1990 | Isii | 310/89 |
| 5,025,184 A | * | 6/1991 | Sekine et al. | 310/71 |
| 5,350,281 A | * | 9/1994 | Hagshenas | 417/371 |
| 5,650,677 A | * | 7/1997 | Furukawa et al. | 310/88 |
| 5,793,132 A | * | 8/1998 | Hirose et al. | 310/71 |
| 5,821,653 A | * | 10/1998 | Kinto et al. | 310/89 |
| 5,936,322 A | * | 8/1999 | Yamaguchi et al. | 310/156.19 |

FOREIGN PATENT DOCUMENTS

| | | | | |
|---|---|---|---|---|
| JP | 09-048250 | | 2/1997 | |
| JP | 2000009211 A | * | 1/2000 | F16H/57/02 |

* cited by examiner

Primary Examiner—David A. Bucci
Assistant Examiner—Timothy McAnulty
(74) Attorney, Agent, or Firm—Westerman, Hattori, Daniels & Adrian, LLP

(57) ABSTRACT

A breather device for a power train of an electric vehicle including an electric motor and a gearbox connected to the electric motor. The breather device comprises: a breather chamber provided above a connecting portion connecting an electric motor housing and a gearbox casing; a first breather passage providing a communication between the breather chamber and an inside of the electric motor housing; and a second breather passage providing a communication between the breather chamber and a lubricating oil separation chamber formed in the gearbox casing.

3 Claims, 6 Drawing Sheets

BREATHER DEVICE FOR POWER TRAIN OF ELECTRIC VEHICLE

FIELD OF THE INVENTION

The present invention relates to a breather device for a power train (electric motor and gearbox) of an electric vehicle.

BACKGROUND OF THE INVENTION

In a general vehicle, a gear case accommodating a gearbox (transmission, etc.) is provided with a breather device so that air within the gear case escapes to the outside through a breather chamber to prevent the air from rising to high temperatures and high pressures. Further, in an electric vehicle, a motor case accommodating an electric motor is also provided with a breather device to prevent air within the motor case from rising to high temperature and high pressure.

However, in this conventional electric vehicle, a breather device is provided for each gear case and motor case and the respective cases are enlarged in the size. Especially, an electric vehicle utilizing a fuel cell separately requires a supercharger, a large-sized radiator and the like in an engine compartment which accommodates the gear case and the motor case. Therefore, there is a need for each case to be rendered compact in size.

Accordingly, the purpose of the present invention is to provide a breather device for a power train of an electric vehicle which decreases the size of the gear case and the motor case.

SUMMARY OF THE INVENTION

According to a first aspect of the invention, there is provided a breather device for a power train of an electric vehicle including an electric motor and a gearbox connected to the electric motor. The breather device comprises: a breather chamber provided above a connecting portion connecting an electric motor housing and a gearbox casing; a first breather passage providing a communication between the breather chamber and an inside of the electric motor housing; and a second breather passage providing a communication between the breather chamber and a lubricating oil separation chamber formed in the gearbox casing.

Herein, the term "gearbox" includes a power transmission device such as a single stage reduction gear device, a multistage transmission, and a continuously variable transmission.

In this construction of the breather device, one breather chamber communicates with the inside of the electric motor housing and the inside of the gearbox casing through the first and second breather passages respectively so that air within the housing and the casing can escape from the breather chamber. Further, since the second breather passage is in communication with the breather chamber and the lubricating oil separation chamber, even if lubricating oil is splashed by the gears within the gearbox, the splashed lubricating oil is separated in the lubricating oil separation chamber so as to prevent the lubricating oil from entering into the breather chamber through the second breather passage. Further, temperature of the breather chamber drops abruptly after a long hour drive under a lower outer temperature. However, since the gears within the gearbox and the lubricating oil have large heat quantities, these heat quantities are absorbed by air within the breather chamber through the second breather passage and therefore temperature in the breather chamber decreases gradually.

According to a second aspect of the invention, the aforementioned breather device may be made such that a terminal box is provided above the connecting portion in communication with the electric motor housing, that an outer wall forming the terminal box and an outer wall forming the gearbox casing are used to form part of the breather chamber, and that part of a cover member which covers the terminal box is used as an upper wall of the breather chamber.

In this construction of the breather device, in addition to the above advantages, the breather chamber can be rendered compact in size. The outer wall of the terminal box and the outer wall of the gearbox casing are utilized to form part of the breather chamber, which is further covered by part of the cover member to form the breather chamber. In other words, by utilizing the outer wall of the terminal box and the outer wall of the casing the breather chamber is formed, leading to provision of a compact breather chamber without increasing the weight. Further, by disengaging the cover member of the terminal box the breather chamber is open and seen during the maintenance of the terminal box.

According to a third aspect of the invention, the aforementioned breather device according to the second aspect of the invention, the outer wall forming the terminal box extends such that an upper end thereof tilts toward the gearbox.

In this construction of the breather device, in addition to the above advantages, workability and assembly of the terminal box can be facilitated because the outer wall of the terminal box tilts and the open end of the terminal box obliquely faces upward. The dead space below the tilted terminal box is effectively utilized as the breather chamber. Therefore, the electric motor housing and the gearbox casing can be rendered compact in size.

BRIEF DESCRIPTION OF THE DRAWINGS

A preferred embodiment of the present invention will be described below, by way of example only, with reference to the accompanying drawings, in which.

DESCRIPTION OF THE PREFERRED EMBODIMENT

Figure 1:
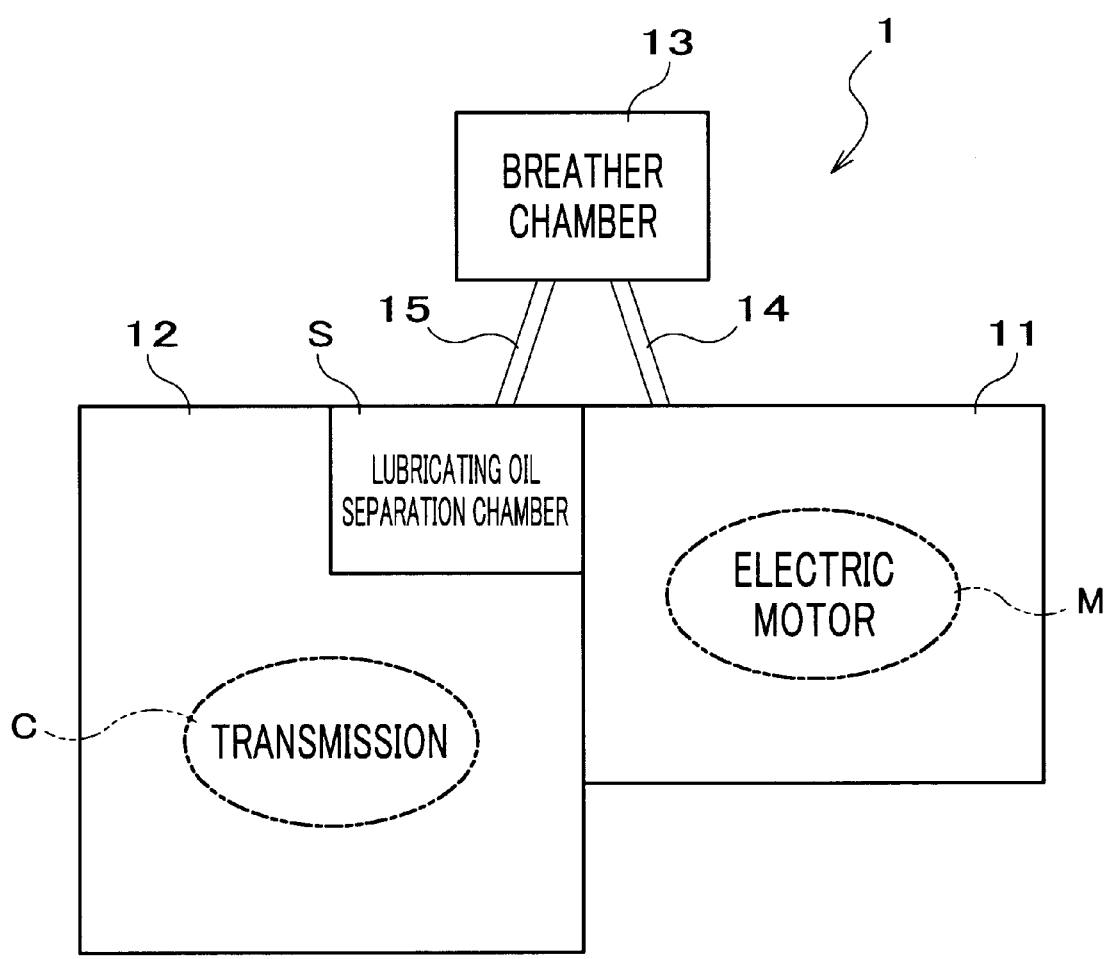
FIG. 1 is a conceptual view illustrating a breather device for a power train of an electric vehicle according to the invention.

With reference to the accompanying drawings, a breather device for a power train of an electric vehicle according to the invention will be described. Referring firstly to FIG. 1, a breather device for a power train of an electric vehicle according to the invention will be described conceptually.

As shown in FIG. 1, a breather device 1 includes a breather chamber 13 provided above a connecting portion connecting a motor case (housing) 11 accommodating an electric motor M and a gear case (casing) 12 accommodating a gearbox C. The breather device 1 further includes a first pipe (first breather passage) 14 connecting the breather chamber 13 and the inside of the motor case 11, and a second pipe (second breather passage) 15 connecting the breather chamber 13 and a lubricating oil separation chamber S formed in the gear case 12. The term "gear case" indicates a case accommodating a power transmission device (gearbox) such as a single stage reduction gear device, a multistage transmission, and a continuously variable transmission.

With reference to FIGS. 2 through 6, the breather device 1 will be described further.

Figure 2:
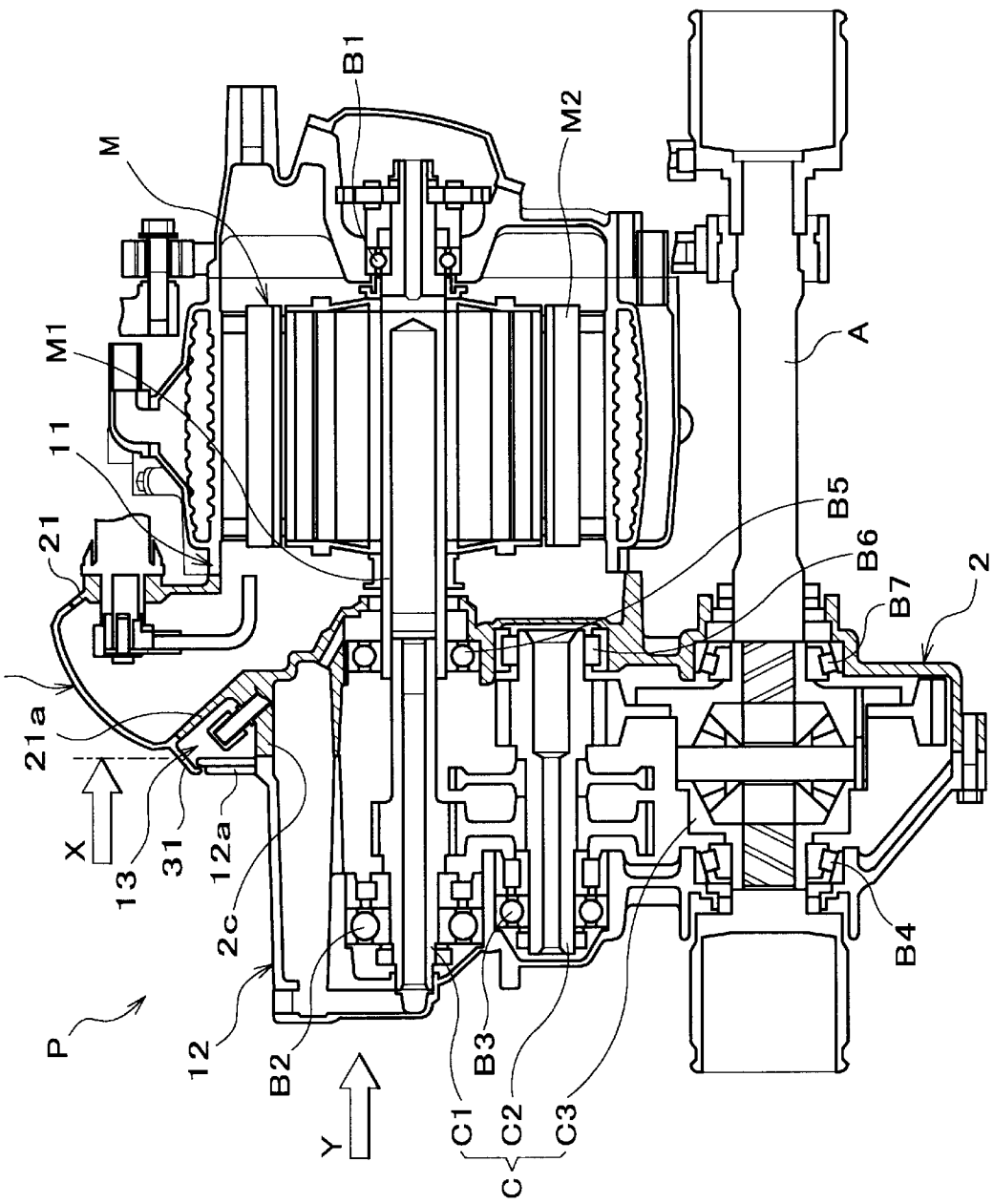
FIG. 2 is a sectional view illustrating a main structure of the power train.

As seen in FIG. 2, the power train P of an electric vehicle includes an electric motor M and a gearbox C connected to the electric motor M. The gearbox C mainly consists of an input shaft C1 to be connected at one end of a rotary shaft M1 of the electric motor M, an intermediate shaft C2 having reduction gears meshable with gears formed at appropriate positions of the input shaft C1, and a differential gear set C3 transmitting torque from the intermediate shaft C2 to the axle A. The electric motor M is accommodated in the motor case 11, and the gearbox C is accommodated in the gear case 12. The motor case 11 and the gear case 12 are connected with the common case (connecting portion) 2 positioned therebetween, and the common case 2 also serves as part of the motor case 11 and part of the gear case 12.

The motor case 11 is provided with a bearing B1 for rotatably supporting the other end of the rotary shaft M1 of the electric motor M. The motor case 11 is formed to cover the entire body M2 of the electric motor M.

The gear case 12 is provided with bearings B2, B3, and B4 rotatably supporting the input shaft C1, the intermediate shaft C2, and one end of the differential gears C3 of the gearbox C, respectively. The gear case 12 is formed to cover part of the gearbox C.

The common case 2 is provided with bearings B5, B6 and B7 rotatably supporting the input shaft C1, the intermediate shaft C2, and the other end of the differential gears C3 of the gearbox C, respectively. Provided above the common case 2 is a terminal box 21 communicating with the inside of the motor case 11. A cover member 3 is positioned at the upper end of the terminal box 21 to cover the opening. In order to facilitate a wiring operation, the terminal box 21 is formed integrally with the common case 2 and extends such that the upper end thereof tilts toward the gear case 12. With the terminal box 21 being tilted toward the gear case 12, a dead space is formed below the terminal box 21. This dead space is used as the breather chamber 13.

Figure 3:
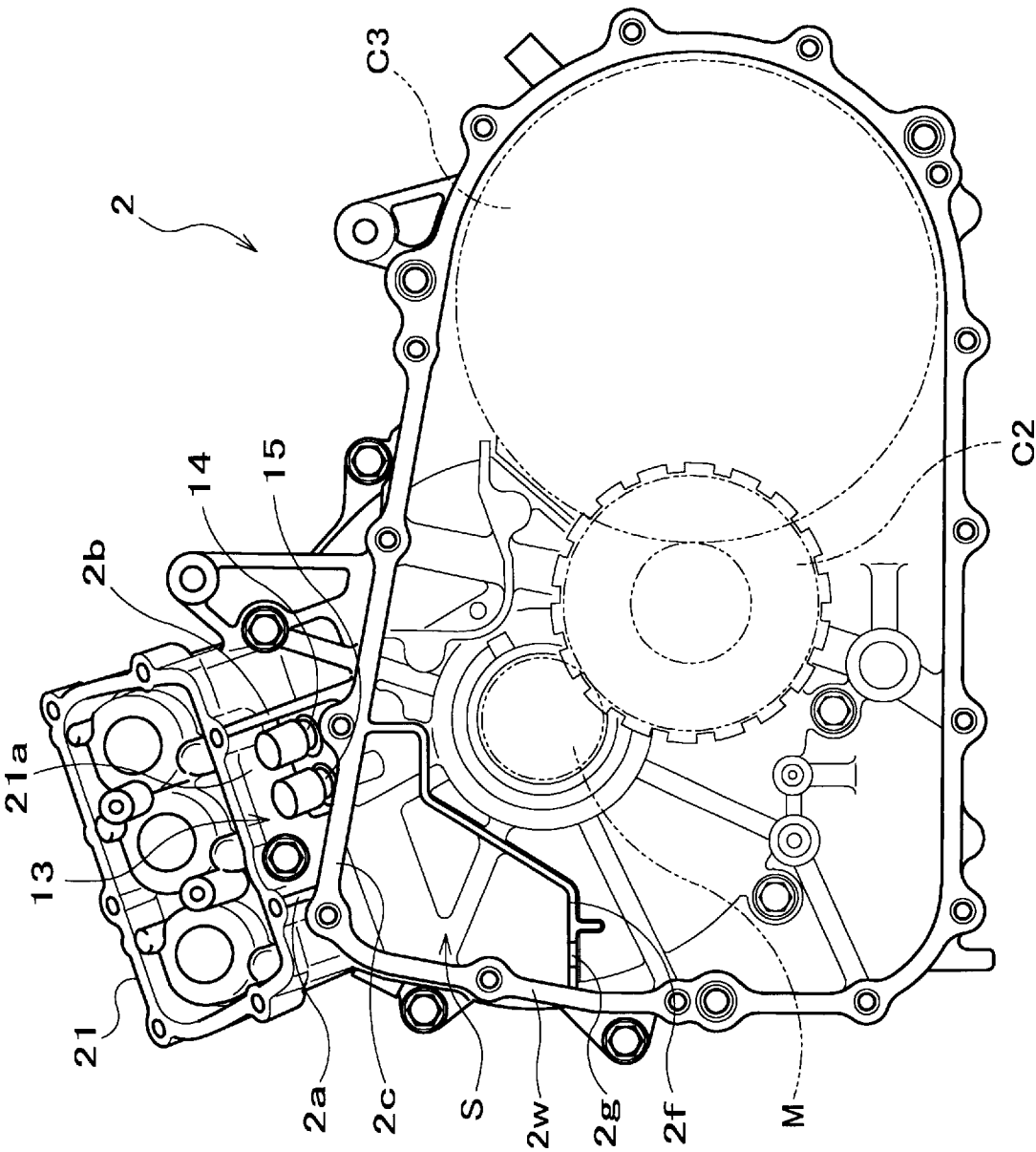
FIG. 3 is a sectional view of a common case viewing in the direction of arrow X of FIG. 2.

As best seen in FIGS. 2 and 3, the breather chamber 13 is formed by first through fourth sidewalls 21a, 2a, 2b, and 12a, a bottom wall 2c, and an upper wall 31 extending from the cover member 3. The first sidewall (outer wall constructing part of the terminal box) 21a also forms a surface of the terminal box 21 at the gear case side, and the upper end thereof extends to tilt toward the gear case 12.

As seen in FIG. 3, the second and third sidewalls 2a, 2b are integral with the first sidewall 21a of the common case 2/terminal box 21 with both sidewalls 2a, 2b spaced apart parallelly at a certain distance away from each other. The upper end surface of each of the second and third sidewalls 2a, 2b extends to the opening of the terminal box 21, and the end surface thereof at the gear case side extends to the mating surface connecting the gear case 12 and the common case 2 (FIG. 2).

Figure 4:
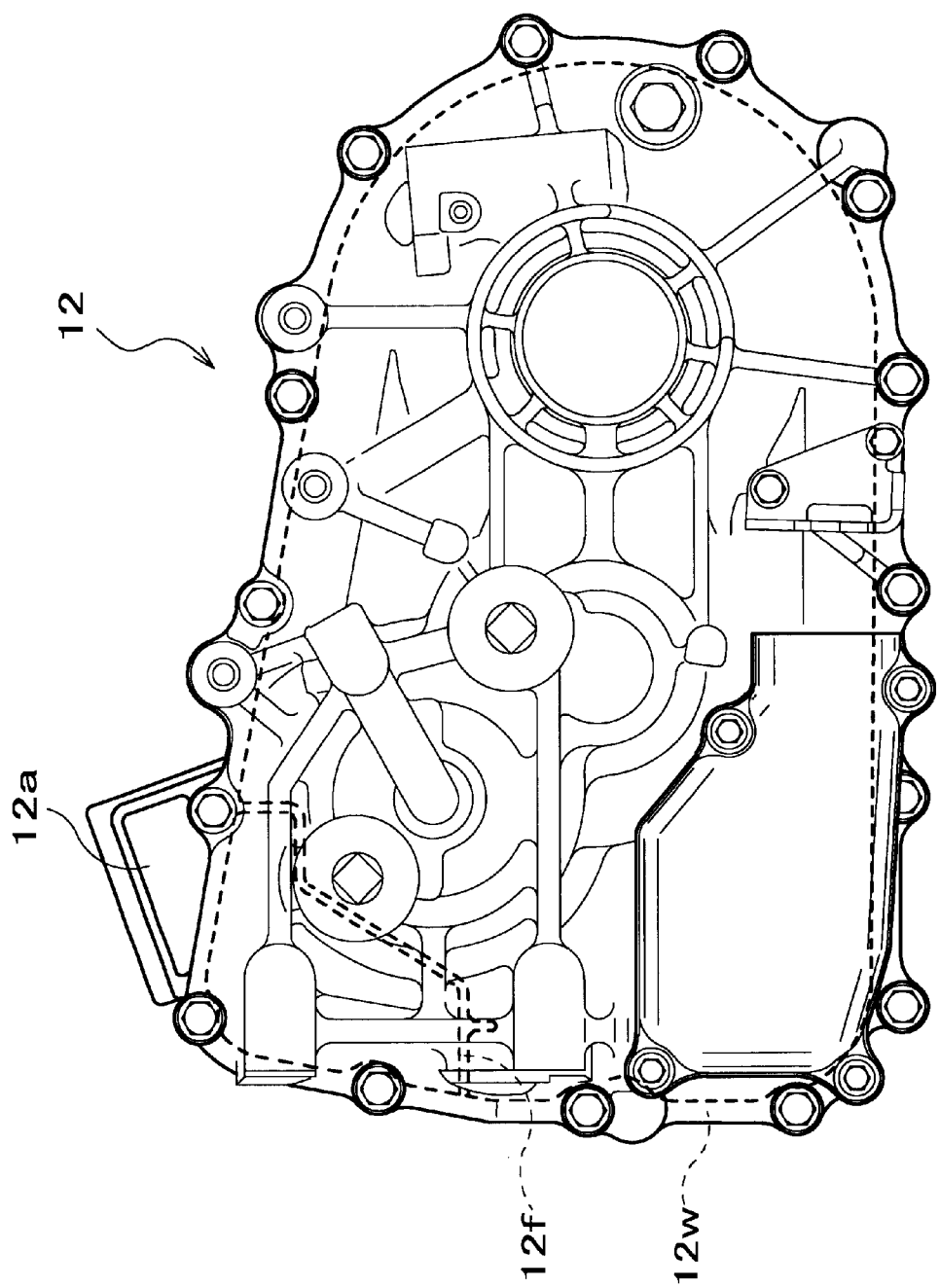
FIG. 4 is a sectional view of a gear case viewing in the direction of arrow Y of FIG. 2.

As seen in FIG. 2, the fourth sidewall 12a is opposed to the first sidewall 21a and extends upward near the mating surface of the gear case 12 against the common case 2. The fourth sidewall 12a, as shown in FIG. 4, is formed such that the upper end surface thereof extends near to the opening of the terminal box 21 and the both side walls thereof extend to the second and third sidewalls 2a, 2b. Further, a surface of the fourth sidewall 12a that positions at the common case side closely contacts with surfaces of the second and third sidewalls 2a, 2b that position at the gear case side.

As shown in FIG. 3, the bottom wall (outer wall constructing the gearbox casing) 2c is part of the outer wall 2w that forms the outer periphery of the common case 2, and is formed integrally with the first sidewall 21a of the terminal box 21 (FIG. 2). The bottom wall 2c is formed such that the end surface thereof closely contact with an end surface of the outer wall 12w that forms the outer periphery of the gear case 12 (FIG. 4).

As shown in FIG. 2, the upper wall 31 is part of the cover member 3 and is formed at the gear case side of the cover member 3 so as to cover the upper end of the fourth sidewall 12a. A certain space is formed between the upper wall 31 and the fourth sidewall 12a.

Figure 5:
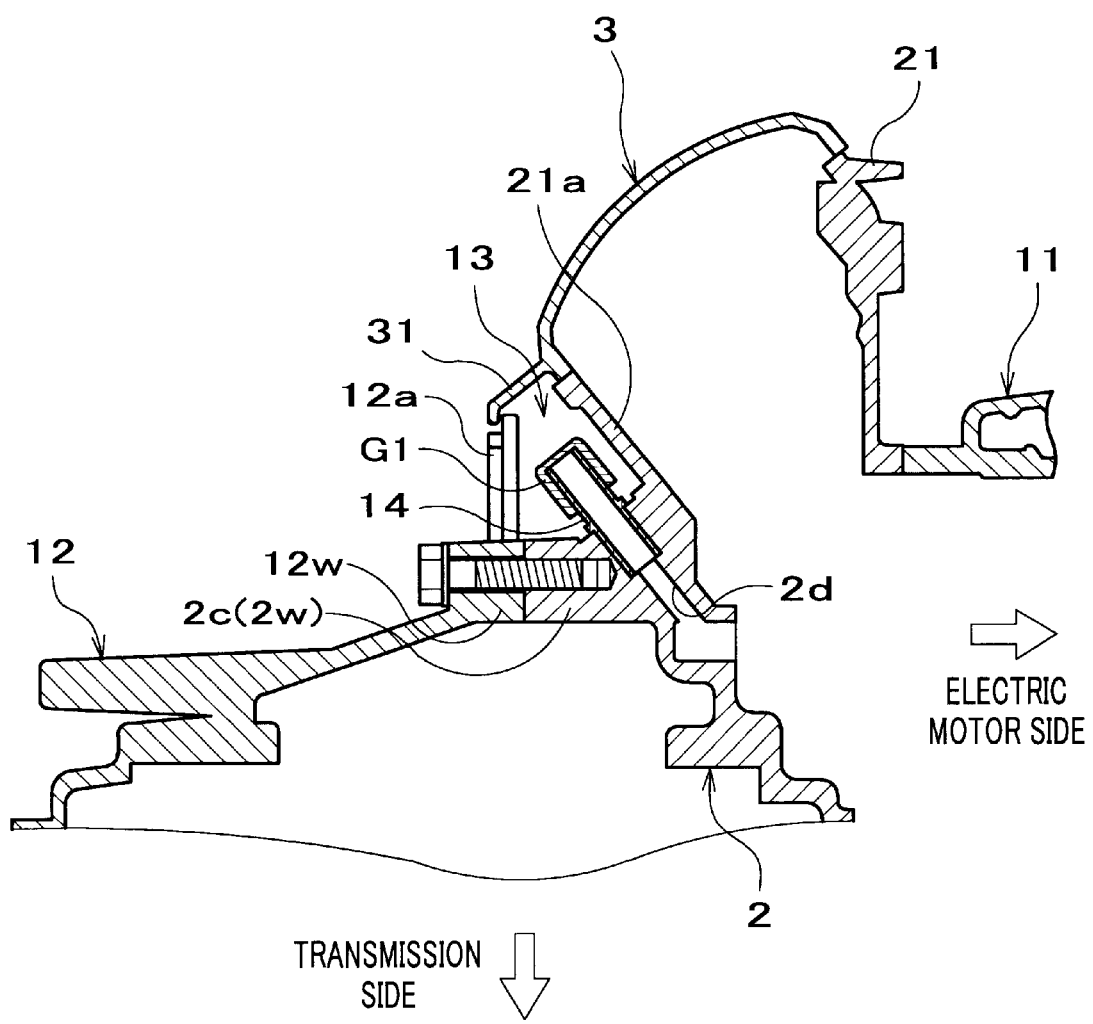
FIG. 5 is an enlarged sectional view illustrating a main structure around a first pipe.

As seen in FIG. 3, the bottom wall 2c of the breather chamber 13 is provided with a first pipe 14 and a second pipe 15, which position adjacently to each other. The first pipe 14, as shown in FIG. 5, is fixed to a communication hole (first breather passage) 2d connecting the breather chamber 13 and the inside of the motor case 11 such that the upper part thereof projects into the breather chamber 13. Mounted on top of the first pipe 14 is a conventional rubber cap G1 to prevent water from the outside as well as to release air to the outside.

Figure 6:
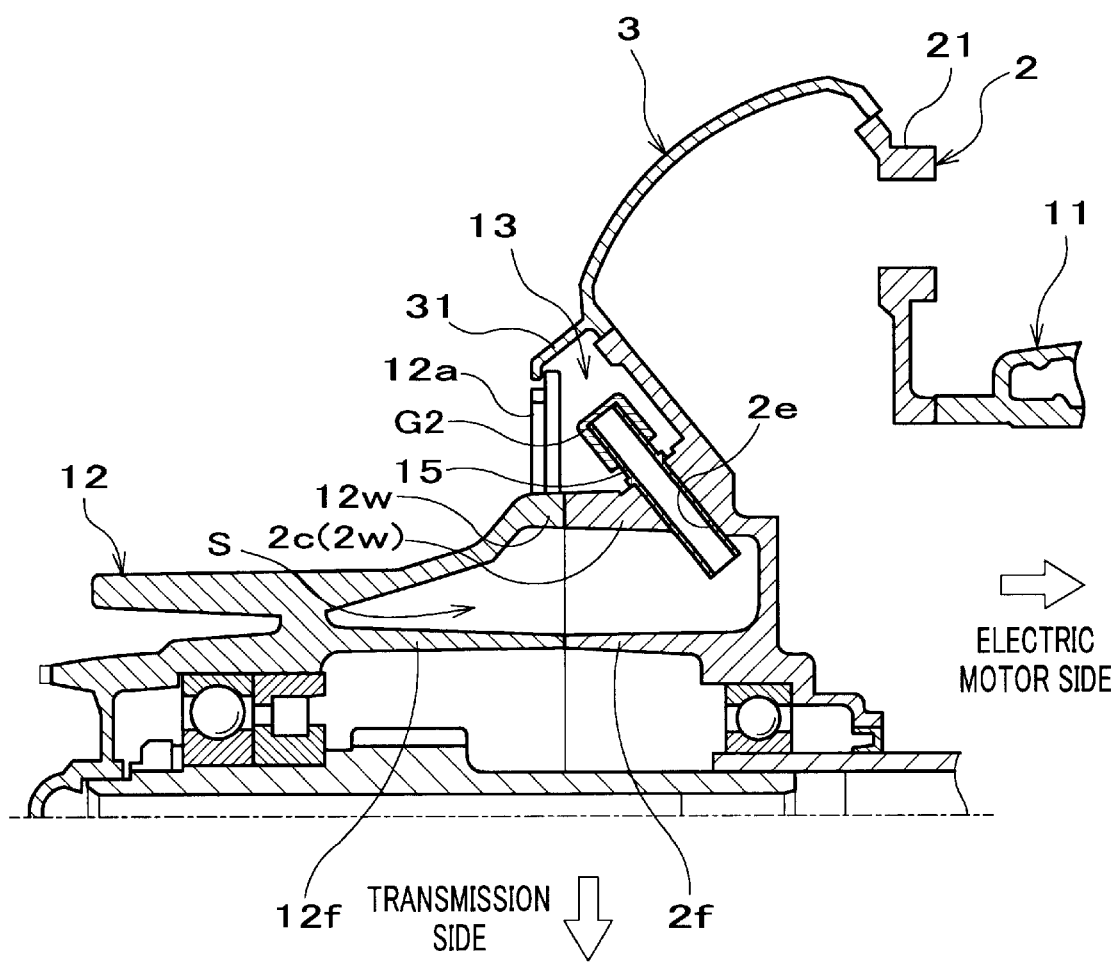
FIG. 6 is an enlarged sectional view illustrating a main structure around a second pipe.

The second pipe 15, as shown in FIG. 6, is fixed to the communication hole (second breather passage) 2e in communication with the breather chamber 13 and the lubricating oil separation chamber S that is formed in the gear case 12. The second pipe 15 extends such that the upper end thereof projects into the breather chamber 13 and the lower end thereof projects into the lubricating oil separation chamber S. A rubber cap G2 similar to the rubber cap G1 is mounted on top of the second pipe 15.

The lubricating oil separation chamber S is formed by end-to-end contacting the outer wall 2w and a rib 2f of the common case 2 with the outer wall 12w and a rib 12f of the gear case 12. As shown in FIG. 3, the rib 2f of the common case 2 is formed in a predetermined shape at an upper part of the common case 2 and at the electric motor side. A groove 2g is provided downward of the rib 2f so that the groove 2g functions as a discharge opening for discharging lubricating oil when the lubricating oil enters into the lubricating oil separation chamber S. As shown in FIG. 4, at an upper part of the gear case 12 and at the electric motor side, there is provided a rib 12f of the gear case 12, the shape of which is corresponding to the rib 2f of the common case 2.

Next, a method of assembling the power train P of the electric vehicle equipped with the breather device 1 will be described.

As best seen in FIG. 2, the common case 2 is fixed to the motor case 11; the electric motor M has been mounted in the motor case 11. The gear case 12, in which the gearbox C has been mounted, is then fixed to the common case 2. In this instance, the second and third sidewalls 2a, 2b and the bottom wall 2c of the common case 2 (FIG. 3) are mated with the fourth sidewall 12a of the gear case 12 (FIG. 4), so that the breather chamber 13 is formed with its upper part open. Further, the outer wall 2w and the rib 2f of the common case 2 (FIG. 3) and the outer wall 12w and the rib 12f of the gear case 12 (FIG. 4) are end-to-end contacting with each other to form the lubricating oil separation chamber S. The discharge opening of the lubricating oil separation chamber S is formed by contacting the end surface of the rib 12f of the gear case 12 with the opening of the groove 2g that is formed in the rib 2f of the common case 2. When covering the cover member 3 over the opening of the terminal box 21 of the common case 2 as illustrated in FIG. 2, the breather chamber 13 is consequently constructed and the assembling operation of the power train P is completed.

Operation of the breather device 1 will be described below.

When driving an unshown electric vehicle for a long period of time, the electric motor M and the gearbox C shown in FIG. 2 will generate heat whereby air within the motor case 11 and the gear case 12 increases to high temperatures and high pressures. As shown in FIG. 5, the high temperature and high pressure air within the motor case 11 passes through the communication hole 2d and the first pipe 14, and moves to the breather chamber 13. The high temperature and high pressure air that has moved in the breather chamber 13 is then released to the outside through a gap between the upper wall 31 and the fourth sidewall 12a.

As shown in FIG. 3, the high temperature and high pressure air within the gear case 12 moves to the lubricating oil separation chamber S through the discharge opening defined by the groove 2g of the rib 2f. Then, as shown in FIG. 6, the high temperature and high pressure air that has moved in the lubricating oil separation chamber S moves to the breather chamber 13 through the second pipe 15. Like air from the motor case 11, the high temperature and high pressure air that has moved in the breather chamber 13 is then released to the outside through the gap between the upper wall 31 and the fourth sidewall 12a. With the rotation of each gear of the input shaft C1 and the intermediate shaft C2, lubricating oil is splashed in the gear case 12. However, even if lubricating oil enters into the lubricating oil separation chamber S, the lubricating oil is separated from air, so that only air moves within the breather chamber 13.

After a long-time drive under a lower ambient temperature, heat quantity of the air within the breather chamber 13 is rapidly absorbed by the ambient air. However, since the input shaft C1, the intermediate shaft C2, the differential gears C3, and lubricating oil in the gear case 12 have large heat quantities, these heat quantities are absorbed by the air within the breather chamber 13 through the second pipe 15, thereby gradually decreasing the temperature in the breather chamber 13. Meanwhile, the heat quantity within the motor case 11 is emitted into the breather chamber 13, in which the temperature gradually decreases, through the first pipe 14.

According to the aforementioned breather device, the following advantages will be achieved.

(1) Since only one breather chamber 13 is required at the connecting portion (common case 2) connecting the motor case 11 and the gear case 12, the power train P of the electric vehicle can be decreased to a smaller size. Further, with the second pipe 15 communicating with the lubricating oil separation chamber S, it is possible to prevent entry of lubricating oil from the second pipe 15 to the breather chamber 13. Furthermore, since the temperature in the breather chamber 13 decreases gradually after a long-time drive under a lower ambient temperature, dew condensation can be prevented reliably within the first pipe that connects the motor case 11 and the breather chamber 13.

(2) The breather chamber 13 that is commonly used for the motor case 11 and the gear case 12 is consequently formed during the assembly of the power train P of the electric vehicle, which improves the productivity.

(3) The dead space formed below the terminal box 21 is effectively utilized as the breather chamber 13, which renders the power train P of the electric vehicle compact in size.

(4) By arranging the breather chamber 13 proximately to the connecting portion (common case 2) connecting the motor case 11 and the gear case 12, the first and second pipes 14, 15 can be adjacent to each other, which renders the breather chamber 13 compact in size.

(5) Since the breather chamber 13 is arranged above the common case 2, unlike the prior art, it is not necessary to connect a breather hose to the breather chamber with its end positioned away from a position where water splashes. Therefore, a breather hose is not necessary, which leads to decreased cost and effective assembly of the breather chamber 13.

(6) Since the first and second pipes 14, 15 project into the breather chamber 13, even if water enters into the breather chamber 13, it is possible to prevent the water from entering deep into the cases 11, 12 through the pipes 14, 15.

While the invention has been described in detail with reference to a specific embodiment thereof, it will be apparent to one skilled in the art that various changes and modifications may be made without departing from the scope of the claims.

(i) In the preferred embodiment, the fourth sidewall 12a and the upper wall 31 are joined to the integrated parts consisting of the first through third sidewalls 21a, 2a, and 2b and the bottom wall 2c so as to form the breather chamber 13. However, the present invention is not limited to this specific form. As long as the outer wall that forms the terminal box and the outer wall that forms the gearbox casing are utilized as part of walls of the breather chamber and part of the cover member that covers the terminal box is utilized as an upper wall of the breather chamber, any structure may be used for the other walls of the breather chamber. In other words, according to this preferred embodiment, as long as the first sidewall 21a and the bottom wall 2c are utilized as part of walls that form the breather chamber 13 and the upper wall 31 extending from the cover member 3 is utilized as an upper wall that forms the breather chamber 13, any structure may be used for the other second through fourth sidewalls 2a, 2b, and 12a. For example, various changes or modifications may be made such that the fourth sidewall 12a is formed integrally with the upper wall 31 of the cover member 3 or the second and third sidewalls 2a, 2b are formed integrally with the fourth sidewall 12a. However, the illustrated preferred embodiment is the most preferable because the second and third sidewalls 2a, 2b function as reinforced ribs to reinforce the terminal box 21.

(ii) In the preferred embodiment, the gearbox is adapted to reduce power from the electric motor M. However, the present invention is not limited to this type, and any known gearbox may be used as long as transmitting power of the electric motor to the axle through gears.

(iii) A gap such as a hole may be formed downward of the third sidewall 2b. In this structure, even if water enters into the breather chamber 13, the water can be released to the outside through the hole of the third sidewall 2b. Further, since the upper outer wall 2w of the common case 2 including the bottom wall 2c tilts downward in a direction from the electric motor M to the differential gears C3, as illustrated in FIG. 3, water within the breather chamber 13 can be discharged reliably.

What is claimed is:

1. A breather device for a power train of an electric vehicle including an electric motor and a gearbox connected to the electric motor, comprising:
- a breather chamber provided above a connecting portion connecting an electric motor housing and a gearbox casing;
- a first breather passage providing a communication between the breather chamber and an inside of the electric motor housing; and
- a second breather passage providing a communication between the breather chamber and a lubricating oil separation chamber formed in the gearbox casing.

2. A breather device for a power train of an electric vehicle according to claim 1, wherein a terminal box is provided above the connecting portion in communication with the electric motor housing, wherein an outer wall forming the terminal box and an outer wall forming the gearbox casing are used to form part of the breather chamber, and wherein part of a cover member which covers the terminal box is used as an upper wall of the breather chamber.

3. A breather device for a power train of an electric vehicle according to claim 2, wherein said outer wall forming the terminal box extends such that an upper end thereof tilts toward the gearbox.

* * * * *